Feb. 5, 1957 R. H. ZETWO 2,780,758
DRY DISK RECTIFIER ASSEMBLIES
Filed Aug. 12, 1953

INVENTOR
Regis H. Zetwo.
BY
W. L. Stout.
HIS ATTORNEY

2,780,758

DRY DISK RECTIFIER ASSEMBLIES

Regis H. Zetwo, Swissvale, Pa., assignor to Westinghouse Air Brake Company, Wilmerding, Pa., a corporation of Pennsylvania Application August 12, 1953, Serial No. 373,742

9 Claims. (Cl. 317—234)

My present invention relates to dry disk rectifiers and particularly to the assembly of miniature dry disk rectifier cells.

Several problems have arisen in the manufacture and assembly of small dry disk rectifier cells having diameters in the order of 1/16 of an inch or less and used in miniature and subminiature electrical and electronic circuits. The smallness of the rectifier cells makes the handling of the cells difficult, and connecting such small cells into the electrical circuits is often quite difficult. One major problem in connecting small rectifier cells into electrical circuits is in obtaining a good electrical connection with the surfaces of the cells. Another problem in handling the small rectifier cells which is of prime import is the deterioration and possible destruction of the cell characteristics when these cells or cell assemblies are connected into the circuits. The rectifier cells or assemblies are usually connected in the same manner as other electrical elements are connected, that is, by soldering the elements to other circuit elements or wires. It has been found that in soldering rectifier assemblies into the circuits that the heat of the soldering operation is conducted through the lead-in wires of the assembly and adversely affects the rectifier characteristics of the cells. To overcome this problem of soldering the rectifier assemblies into the circuits, it has been the practice to provide long leads for the rectifier assemblies which would dissipate the heat of the soldering operation.

It is therefore an object of my invention to provide a small, compact rectifier assembly protected by a sealed housing against the deleterious effects of ambient conditions.

Another object of my invention is to provide resilient means for a dry disk rectifier assembly which form the contact members for the rectifier cell and engage the surfaces of the cell with considerable pressure to provide a good electrical connection therewith.

Still another object of my invention is to provide a rectifier assembly wherein the length of short lead-in wires and the effective lengths of the contact members for the cells are of sufficient total length to dissipate the heat of soldering operations before the heat reaches the cell and adversely affects its characteristics.

The dry disk rectifier assembly in accordance with my invention is enclosed within a metallic tube, the rectifier cell and its attendant elements being embedded in a suitable moisture-resistant potting compound. The rectifier cell of the assembly is held within a heat resistant plastic yoke by two resilient contact members. Each of the contact members comprises a U-shaped spring member having soldered or otherwise secured to its outer leg a short lead-in wire. The inner leg of the contract member, which forms the contact making element for engaging a surface of the rectifier cell, is bowed. The U-shaped members are hooked over opposite sides of the yoke, the inner legs of the contact members engaging the surfaces of the rectifier cell with considerable pressure to provide a good electrical connection with the cell. It has been found that the U-shaped contact members provided for the rectifier cell afford the necessary length together with that of the short lead-in wires to prevent the heat of the soldering operation from affecting the rectifying characteristics of the cell.

These features of the dry disk rectifier assembly described are also characteristic of an assembly wherein two or more rectifier cells are enclosed in a metallic tube, the rectifier cells being embedded in a moisture-resistant potting compound.

Other objects and characteristic features of my invention will appear as the specification progresses.

I shall describe one form of apparatus embodying my invention and shall then point out the novel features thereof in claims.

In the accompanying drawings:

Fig. 2 is an isometric view of the yoked cell assembly embodying my invention, while

Similar reference characters refer to similar parts in each of the views.

Figure 1:
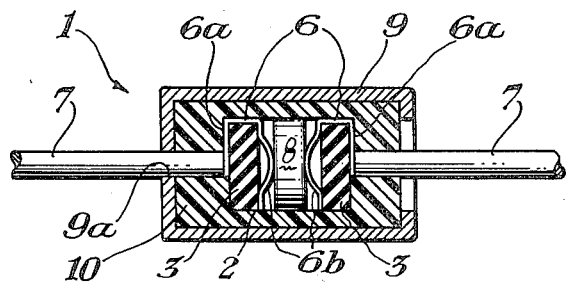
Fig. 1 is a vertical section through a dry disk rectifier assembly embodying my invention.
Figure 2:
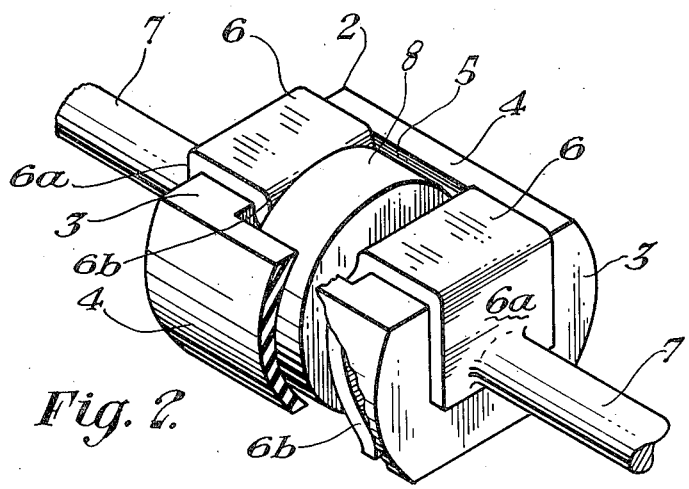

Referring now in detail to Figs. 1 and 2 of the drawings, the reference character 1 designates in general the dry disk rectifier assembly embodying my invention. The dry disk rectifier assembly comprises a yoke 2 of a suitable heat-resistant plastic material, such as nylon, the yoke being formed with two end walls 3, two arcuate side walls 4, and having a recess 5 therebetween. Hooked over the end walls 3 are contact members 6 made of suitable resilient material such as Phosphor bronze, the members being substantially U-shaped, having an outer leg 6a and an inner leg 6b. The outer leg 6a of the contact member is the shorter of the two legs and has soldered thereto, or otherwise suitably connected thereto, a lead-in wire 7. The inner leg 6b of the contact member is bowed, the upper and lower ends of the inner leg abutting the inner sides of the end walls 3. Resiliently held between the bowed inner legs of the contact members is a dry disk rectifier cell 8 which may either be of any of the well-known types such, for example, as copper oxide or selenium. The bowed inner legs of the contact members engage the faces of the rectifier cell 8 with considerable pressure so that a good electrical connection is made therewith.

After the rectifier cell has been assembled in the yoke 2 as described, the assembly is treated with a coating of suitable varnish, shellac or lacquer to hold the assembled elements together. The assembled elements are then inserted in a cylindrical tube 9 made of suitable material, such as brass, the tube being provided at one end with an opening 9a to permit the insertion of a lead-in wire 7. The inner diameter of the tube 9 is substantially equal to the diameter provided for the arcuate side walls 4 of the yoke so that the assembled cell fits within the tube with little clearance. After the assembled unit is within the tube 9, the tube is filled with a suitable moisture-resistant potting compound, designated at 10, the compound then being permitted to harden.

Figure 3:
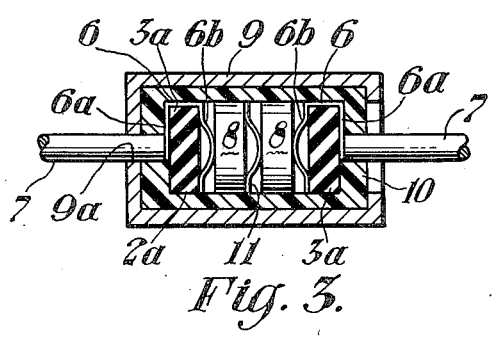
Fig. 3 is a vertical section through a multicell dry disk rectifier assembly embodying the invention.

In Fig. 3 of the accompanying drawings, I have illustrated a multi-cell assembly wherein two rectifier cells 8 are held within a yoke 2a by the resilient contact members 6 hooked over the sides 3a of the yoke in the manner described, a resilient contact member 11 being interposed between the two cells. The resilient contact member 11 may take various forms and is herein illustrated as a flat, bowed spring, the ends of the spring engaging one of the cells while the arcuate median portion of the spring engages the other cell. The contact member 11 forms an electrical connection between the two cells and provides the necessary pressure for maintaining the cells in engagement with the contact members 6. The assembled yoke 2a is then handled in the manner hereinabove described, the yoke being inserted into the tube 9 and the tube filled with a suitable moisture-resistant potting compound 10.

Although I have illustrated a multi-cell assembly in Fig. 3 wherein two rectifier cells are used, it will be readily apparent that any number of cells may be assembled in the manner described. In a multi-cell assembly, the end cells are engaged by the resilient contact members 6 and maintained in engagement with the contact members by the pressure exerted by the resilient contact members 11 interposed between the end cells and any additional cells comprising the assembly, resilient contact members being interposed between any adjacent additional cells.

It will thus be seen that I have provided a rectifier cell assembly which is enclosed in a suitable protective housing protecting the elements against any adverse ambient conditions. By providing a U-shaped contact member of resilient material for engaging the surfaces of the cell, a good electrical connection is made with the surfaces of the rectifier cell. The contact members also provide the necessary means for dissipating the heat of the soldering operations when the assembly is connected into an electrical circuit. The effective length of the contact members and their large surface areas together with the comparative short lengths of the lead-in wires 7 provide the necessary means for dissipating the heat of the soldering operations.

Although I have herein shown and described two forms of apparatus embodying my invention, it is understood that various changes and modifications may be made therein within the scope of the appended claims without departing from the spirit and scope of my invention.

Having thus described my invention, what I claim is:

1. A rectifier assembly comprising, a yoke having an opening therein, a rectifier cell within the yoke opening, U-shaped resilient contact members having inner and outer legs, the inner legs being hooked over said yoke and engaging the faces of the cell with some pressure for making electrical connection therewith and for holding said cell within said yoke opening, and circuit connectors for the outer legs of said contact members.

2. A rectifier assembly comprising, a yoke having an opening therein, a rectifier cell within the yoke opening, U-shaped resilient contact members having a large surface area and formed with inner and outer legs, the inner legs being bowed and hooked over the yoke to engage the faces of said cell with some pressure for making electrical connection therewith and for holding said cell within the yoke opening, and circuit connections for the outer legs of said contact member.

3. A rectifier assembly comprising, a yoke, a rectifier cell within said yoke, U-shaped resilient contact members engaging the opposite faces of said cell and said yoke to hold said cell within said yoke; means for holding said cell, yoke and members together as an assembly; and circuit connections for the U-shaped contact members.

4. A rectifier assembly comprising a yoke, a rectifier cell within said yoke, U-shaped resilient contact members engaging the opposite faces of said cell and said yoke to hold said cell within said yoke; means for holding said cell, yoke and members together as an assembly; a housing for the assembly including a moisture-resistant compound in which said assembly is embedded, and circuit connections for the U-shaped contact members exteriorly of said housing.

5. A rectifier assembly comprising, a yoke having an opening therein, a rectifier cell within the yoke opening, U-shaped resilient contact members having a large surface area and formed with inner and outer legs, the inner legs being bowed and hooked over the yoke to engage the faces of said cell with some pressure for making electrical connection therewith and for holding said cell within the yoke opening; means for holding said cell, yoke and members together as an assembly; and circuit connections for the outer legs of said contact members.

6. A rectifier assembly comprising, a yoke having an opening therein, a rectifier cell within the yoke opening, U-shaped resilient contact members having a large surface area and formed with inner and outer legs, the inner legs being bowed and hooked over the yoke to engage the faces of said cell with some pressure for making electrical connection therewith and for holding said cell within the yoke opening; means for holding said cell, yoke and members together as an assembly; a housing including a moisture-resistant compound in which the assembly is embedded, and circuit connections for the outer legs of said contact members exteriorly of said housing.

7. A multi-cell rectifier assembly comprising, a yoke having an opening therein, at least two rectifier cells within the yoke opening, U-shaped resilient contact members having inner and outer legs, the inner legs being hooked over said yoke and engaging the outer faces of the end cells, a resilient contact member interposed between adjacent faces of the cells to exert a pressure on said cells whereby electrical connections are made between adjacent cells and the U-shaped contact members, and circuit connectors for the outer legs of the U-shaped contact members.

8. A multi-cell rectifier assembly comprising, a yoke having an opening therein, at least two rectifier cells within the yoke opening, U-shaped resilient contact members having inner and outer legs, the inner legs being hooked over said yoke and engaging the outer faces of the end cells, a resilient contact member interposed between adjacent faces of the cells to exert a pressure on said cells whereby electrical connections are made between adjacent cells and the U-shaped contact members, means for holding said yoke, cells and contact members together as an assembly, a housing for the assembly including a moisture-resistant compound in which the assembly is embedded, and circuit connectors for the outer legs of the U-shaped contact members exteriorly of said housing.

9. A multi-cell rectifier assembly comprising, a yoke having an opening, at least two rectifier cells within the yoke opening, U-shaped resilient contact members having a large surface area and formed with inner and outer legs, the inner legs being bowed and hooked over the yoke to engage the outer faces of the end cells, a resilient contact member interposed between adjacent faces of the cells to exert a pressure on said cells whereby electrical connections are made between adjacent cells and the U-shaped contact members, means for holding said yoke, cells and contact members together as an assembly, a housing for the assembly including a moisture-resistant compound in which the assembly is embedded, and circuit connectors for the outer legs of the U-shaped contact members exteriorly of said housing.

References Cited in the file of this patent

UNITED STATES PATENTS

| 2,433,566 | Lamb | Dec. 30, 1947 |
| 2,665,399 | Lingel | Jan. 5, 1954 |

FOREIGN PATENTS

| 52,229 | France | June 21, 1943 |